United States Patent
Schramm et al.

(10) Patent No.: US 8,562,331 B2
(45) Date of Patent: Oct. 22, 2013

(54) METHOD AND TOOL FOR EXPANDING A PIPE END

(75) Inventors: Ervin Willy Schramm, Virsbo (SE); Amalia Barragan Gomez, Linares Jaen (ES); Duane L. Adelman, Lakeville, MN (US); Randall J. Knapp, Excelsior, MN (US); Janne Eklund, Alcorcón (ES)

(73) Assignee: Uponor Innovation AB, Virsbo (SE)

( * ) Notice: Subject to any disclaimer, the term of this patent is extended or adjusted under 35 U.S.C. 154(b) by 69 days.

(21) Appl. No.: 12/666,456

(22) PCT Filed: Apr. 30, 2008

(86) PCT No.: PCT/FI2008/050241
§ 371 (c)(1),
(2), (4) Date: Aug. 12, 2010

(87) PCT Pub. No.: WO2009/000966
PCT Pub. Date: Dec. 31, 2008

(65) Prior Publication Data
US 2010/0308503 A1    Dec. 9, 2010

Related U.S. Application Data

(60) Provisional application No. 60/945,972, filed on Jun. 25, 2007.

(51) Int. Cl.
*B29C 57/04* (2006.01)

(52) U.S. Cl.
USPC ............... 425/393; 425/467; 425/DIG. 218; 72/393

(58) Field of Classification Search
USPC ............ 72/392–393; 425/392–393, 466–468, 425/DIG. 218
See application file for complete search history.

(56) References Cited

U.S. PATENT DOCUMENTS

| 4,378,928 A | * | 4/1983 | Kopp et al. | ............... 425/393 |
| 5,046,349 A | | 9/1991 | Velte | |
| 5,836,197 A | | 11/1998 | McKee et al. | |

(Continued)

FOREIGN PATENT DOCUMENTS

| DE | 8534175 | 3/1986 |
| DE | 4017404 | 10/1991 |

(Continued)

*Primary Examiner* — Richard Crispino
*Assistant Examiner* — Thukhanh Nguyen
(74) *Attorney, Agent, or Firm* — Occhiuti & Rohlicek LLP (57) ABSTRACT

A pipe end is expanded with the aid of an expander tool (1). The expander tool (1) comprises a plurality of jaws (10) that are radially movable between a retracted and an expanded position. The jaws (10) have outer jaw surfaces which are intended for engagement with the inner surface of the pipe end and which lie adjacent to one another in the retracted position of the jaws (10) and have an at least generally circular arcuate shape in cross-section. The expander tool (1) further comprises a piston (2) or cone with a tapered end for moving the jaws (10) between the retracted and the outer expanded positions and the piston (2) is moved in a reciprocating manner in the axial direction before expanding the pipe end gradually in the stages. The axial reciprocating movement of the piston (2) is guided to rotate the jaws (10) to a certain extent in a circumferential direction after each expansion stage.

15 Claims, 6 Drawing Sheets

(56) References Cited

U.S. PATENT DOCUMENTS

| | | | |
|---|---|---|---|
| 7,128,560 B2 * | 10/2006 | Tandart | 425/392 |
| 7,669,328 B1 | 3/2010 | Wake | |
| 7,922,475 B2 * | 4/2011 | Gueit | 425/393 |

FOREIGN PATENT DOCUMENTS

| | | | | |
|---|---|---|---|---|
| DE | 19924695 | | 11/2000 | |
| DE | 102005029681 | | 12/2006 | |
| EP | 0252868 | | 1/1988 | |
| EP | 0417674 | | 3/1991 | |
| EP | 0682758 | | 8/1998 | |
| EP | 1118401 | | 7/2001 | |
| EP | 2090384 | | 8/2009 | |
| EP | 2090385 | | 8/2009 | |
| GB | 1485098 | | 9/1977 | |
| GB | 1524149 | | 9/1978 | |
| JP | 57-009541 | * | 1/1982 | 72/393 |
| JP | 2009125759 | | 6/2009 | |
| WO | WO 9501000 | | 4/1995 | |
| WO | WO 9806519 | | 2/1998 | |

* cited by examiner

METHOD AND TOOL FOR EXPANDING A PIPE END

CROSS-REFERENCE TO RELATED APPLICATIONS

This application is the National Stage of International Application No. PCT/FI2008/050241, filed on Apr. 30, 2008, which claims the priority of U.S. Provisional Patent Application No. 60/945,972, filed on Jun. 25, 2007. The contents of both applications are hereby incorporated by reference in their entirety.

FIELD OF THE INVENTION

The invention relates to a method for expanding a pipe end with the aid of an expander tool, the expander tool comprising a plurality of jaws that are radially movable in relation to a center axis between a retracted and an outer expanded position, wherein said jaws have outer jaw surfaces which are intended for engagement with the inner surface of the pipe end and which lie adjacent to one another in the retracted position of the jaws and have an at least generally circular arcuate shape in cross-section, and a piston or cone with a tapered end for moving the jaws between said positions, whereby the piston is moved in a reciprocating manner in the axial direction for expanding the pipe end gradually in stages.

Further, the invention relates to a tool for expanding a pipe end, the tool comprising a plurality of jaws which are radially movable in relation to a center axis between a retracted position and an outer expanding position and which, when retracted, are intended to be inserted into the pipe end, wherein the movable jaws have outer jaw surfaces which are intended for engagement with the inner surface of the pipe end and which lie adjacent to one another in the retracted position of the jaws and have an at least generally circular arcuate cross section, a piston with a tapered end for moving the jaws between said positions, and means moving the piston in a reciprocating manner in the axial direction for expanding the pipe end gradually in stages.

Pipes are nowadays also made from a material, which has memory capacity, i.e. the pipe automatically strives to essentially return to its original shape and form after having been expanded. One example in this regard is pipes that are manufactured from cross-linked polyolefins, such as cross-linked polyethylene PEX, which possesses active memory capacity at temperatures as low as room temperature. For such pipes, a pipe connection is established by expanding one end of the pipe and inserting into the widened pipe end a connector, which acts as a part of a pipe connecting piece and which is retained in said pipe end until the pipe is shrunk to an extent at which it is able to firmly grip the connecting piece. Optionally, a clamping sleeve made of a resilient material, for instance metal or plastic, which may be the same plastic material as the material from which the pipe is made, is expanded and shrunk over the pipe end in order to further enhance the holding and the sealing pressure in the pipe connecting region. The clamping sleeve can be expanded at the same time as the pipe end is expanded, with the clamping sleeve in position around said pipe end.

EP 0 417 674 discloses an expander tool for expanding a pipe end. The expander tool includes a number of jaws, which can be moved radially in relation to a center axis between a retracted position, in which the jaws lie close together, and an outer, pipe expanding position. The jaws have outer jaw surfaces, which are delimited by mutually opposing jaw edges and are intended for engagement with the inner surface of the pipe end and which are at least essentially circularly arcuate in shape when seen in cross-section. However, the opposing edges of the outer jaw surfaces tend to produce on the inner surface of the pipe end continuous grooves or score lines, which extend in the direction of the longitudinal axis of the pipe. When a fluid under pressure flows through a pipe connection that has been established by the expansion method, the fluid tends to follow the score lines and seep through the pipe connection. Thus, the tightness of the joint is not adequate.

EP 0 682 758 discloses a corresponding expander tool also comprising recesses on the outer surface of the jaws. These recesses cause promontories on the inner surface of the pipe by causing interruptions in the score lines that are liable to be formed by the jaw edges on the inner surface of the pipe end during the final stage of the pipe end expansion process. However, the result is that the inner surface of the pipe end is not even, whereby the pipe connection is not always tight enough.

WO 95/10 000 discloses an expander tool in which the radial distance of the outer jaw surfaces from the center axis increases from the insertion end of said jaws to their opposite end. The pipe end is expanded in stages, i.e. the mutually retracted jaws are inserted to a given distance in the pipe end and then brought to an expanded state while expanding the pipe end to a relatively small extent, whereafter the jaws are again brought together or retracted and inserted further into the pipe end. The jaws are then again brought to an expanded state while further expanding the pipe end. The method is repeated until the pipe end has been expanded to the extent desired, for instance until the outer jaw surfaces have been inserted at full length into the pipe end and brought to an expanded state, whereupon the jaws are withdrawn from said pipe end after having been returned to the retracted state or position. However, using the tool requires carefulness and quite high skills in order to ensure that the connection is tight enough.

EP 1 118 401 discloses an expander tool in which the jaws are mounted in a bushing. The jaws are brought to an expanded state by a tapered piston. The bushing and thereby the jaws are axially movable. When the jaws are moved axially closer to the piston, the expanded state of the jaws is larger. Thus, the axial displacement of the jaws allows widening of the pipe end in stages. However, the structure of the expander tool is rather complicated and it is quite difficult to manufacture the tool and use the tool to achieve a tight enough connection.

BRIEF DESCRIPTION OF THE INVENTION

The object of the invention is to provide a new method and tool for expanding pipe ends.

The method of the invention is characterized in that the axial reciprocating movement of the piston is guided to rotate the jaws to a certain extent in the circumferential direction after each expansion stage.

Further, the tool of the invention is characterized by means for guiding the axial reciprocating movement of the piston to rotate the jaws to a certain extent in the circumferential direction after each expansion stage.

In the invention, the pipe end is expanded gradually in stages. After each expansion the jaws are rotated in the circumferential direction. Thus, the position of the jaws in the circumferential direction is changed after each expansion stage. The rotation of the jaws is effected by the axial movement of the piston that expands the jaws. The piston produces a reciprocating motion which is controlled to rotate the jaws to a certain extent in the circumferential direction. Thus, each sequential expansion by the jaws is exerted to a different position of the inner surface of the pipe end. Thus, the forming of the score lines is obviated and the inner surface of the expanded pipe end is therefore even. The installer can hold the expander tool in the same position all the time and the pipe connection will still become tight.

BRIEF DESCRIPTION OF THE DRAWINGS

The invention is further described in the attached drawings, in which.

For the sake of clarity, the figures show some embodiments of the invention in a simplified manner. In the figures, like reference numerals identify like elements.

DETAILED DESCRIPTION OF THE INVENTION

Figure 1:
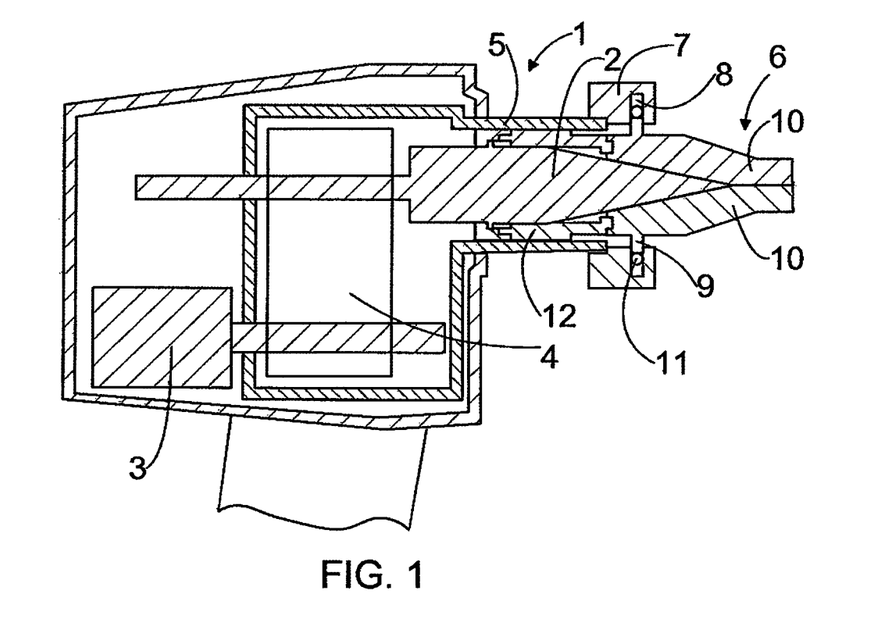
FIG. 1 is a schematic cross-sectional side view of an expander tool.

FIG. 1 shows an expander tool 1. The expander tool 1 comprises a piston 2 that has a tapered end. The piston 2 is moved in a reciprocating manner in the axial direction by means of an electric motor 3. The piston 2 only moves in the axial direction, and so it does not rotate. The power of the electric motor 3 is transferred to move the piston 2 by using a gearbox 4. The expander tool can also be formed such that the reciprocating movement of the piston is achieved by manual, pneumatic, hydraulic or any other suitable means.

The expander tool 1 comprises a housing 5 in which the piston 2 can be moved in a reciprocating manner. An expander head 6 is attached to the housing 5.

The expander head 6 comprises a screw-on cover 7, which is attached to the threads on the outer surface of the housing 5. The cover 7 includes a through-penetrating central opening and a circular groove 8, in which radial parts 9 of segments or jaws 10 are received in a manner which will permit the jaws 10 to move radially but not axially relative to the ring groove 8. The radial parts 9 are provided with peripheral grooves, which receive an annular spring 11, which surrounds the jaws 10 and which endeavours to hold the jaws in their retracted state or in a position in which they lie against the piston end 2.

The tool is expanded by moving the piston 2 forwards from its withdrawn position, whereby the tapered end of the piston 2 engages with bevelled surfaces on the jaws 10 and forces the jaws 10 apart. The number of jaws 10 may be, for example, 6 or any other suitable number. The jaws 10 move radially outwards in relation to a center axis of the piston 2. The jaws 10 have outer jaw surfaces which, when seen in cross-section at a right angle to the piston axis, are at least generally arcuate in shape and lie adjacent to one another when the jaws 10 are in a retracted state or position.

The radial distance of the respective outer jaw surfaces from the center axis of the piston increases from their forward ends or insertion ends to their opposite or rear ends. This increase in distance can be effected continuously, as shown in FIG. 1, or stepwise.

When expanding one end of a pipe which is made of a material having memory capacity, the jaws 10 are contracted so that the outer diameter of the insertion end of the tool will be smaller than or essentially equal to the inner diameter of the pipe end to be expanded. The insertion end of the tool is inserted into said pipe end along a distance which is much shorter than the full length of the jaws 10. The jaws 10 are moved apart and then returned to the retracted position and the tool is then moved further into the now slightly expanded pipe end. The procedure is repeated until the pipe end is in abutment with the cover 7. A pipe connecting piece can be inserted into the widened pipe end after removing the jaws 10 therefrom and the pipe end is crimped around said connecting piece.

After each expanding stage the jaws 10 are rotated a certain amount in the circumferential direction. The cover 7 is immovable with respect to the housing 5, but it must allow the rotation of the jaws 10. The rotation of the jaws 10 is effected by means of a rotating sleeve 12. The mechanism of the rotation and the structure of the sleeve 12 can be seen more clearly in FIGS. 2 and 3.

Figure 2:
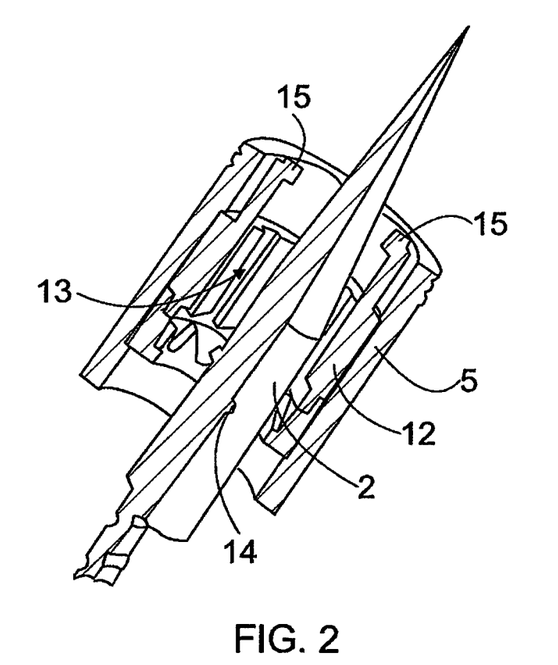
FIG. 2 is a schematic cross-sectional perspective view of a detail in the expander tool shown in FIG. 1.
Figure 3:
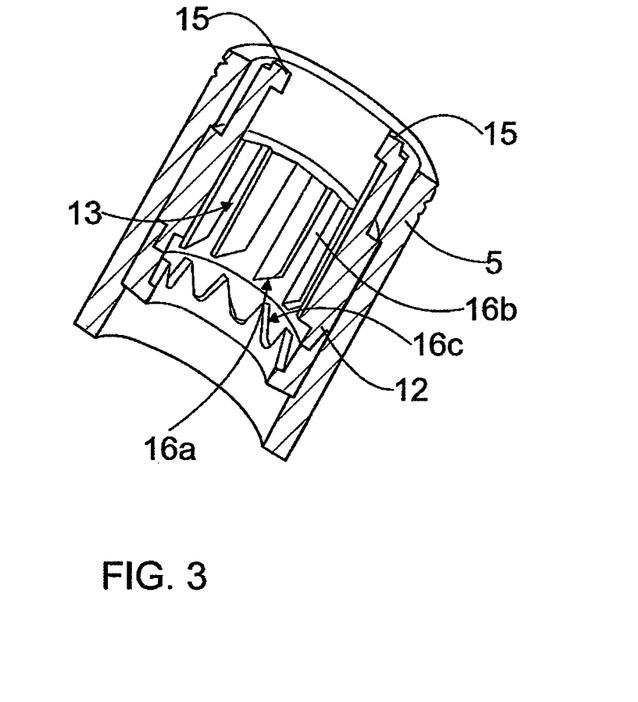
FIG. 3 is a similar view as in FIG. 2, but without a piston.

The sleeve 12, which can rotate with respect to the housing 5 around the axis of the piston 2, is provided with inner grooves 13. The non-rotating piston 2 is provided with pins 14 which move in grooves 13. Because of the geometry of the grooves 13, the reciprocating axial movement of the piston 2 is transformed into a rotating movement of the sleeve 12.

The sleeve 12 is provided with fingers 15, which rotate the jaws 10 when the sleeve 12 is rotating. The rear ends of the jaws 10 are provided with cuts, into which the fingers 15 are attached. The number of fingers 15 may be such that each jaw 10 is provided with its own finger 15. However, if the sleeve 12 is only rotating when the jaws 10 are substantially in the retracted position, a smaller number of fingers 15, such as two or even one, may be enough.

Figure 4A:
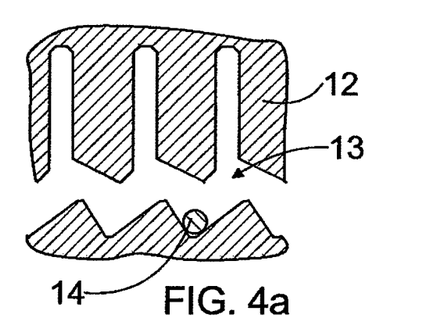
FIGS. 4a-4g are schematic views illustrating the function of a rotating system.
Figure 4B:
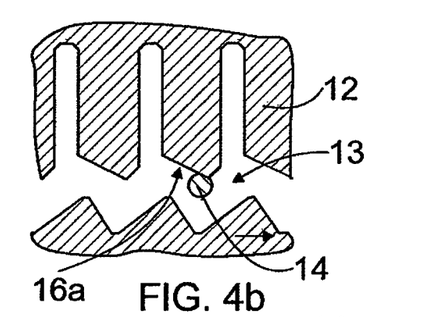
Figure 4C:
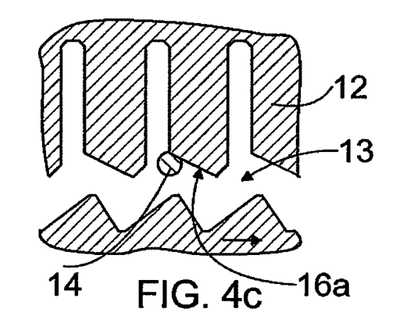
Figure 4D:
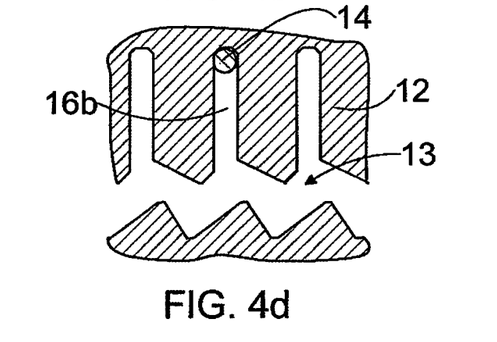

The geometry of the rotating mechanism is schematically explained with reference to FIGS. 4a to 4g. When the expander head 6 is in its unexpanded position, the pin 14 is in the lowest position in the groove 13, as shown in FIG. 4a. When the expander head 6 starts to expand, the pin 14 is pushed upwards in the groove 13. The pin 14 moves upwards and hits the upper sloping wall 16a, as seen in FIG. 4b. This will turn the sleeve 12 and simultaneously the jaws 10, before the expander head 6 comes into contact with the inner wall of the pipe to be expanded.

The pin 14 is pushed upward in the straight part 16b of the groove 13 during the expansion of the expander head 6. The pin 14 will follow the straight part 16b of the groove 13 to the highest point of the groove 13. The pin 14 reaches the highest point when the expander head is fully expanded. See FIGS. 4c and 4d.

Figure 4E:
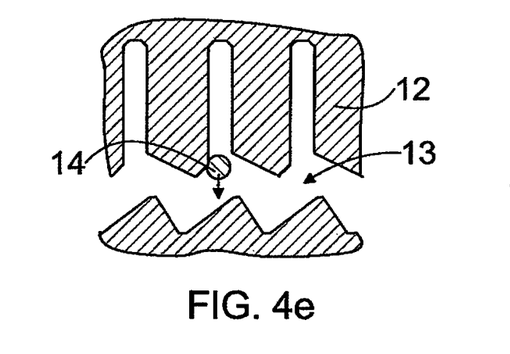
Figure 4F:
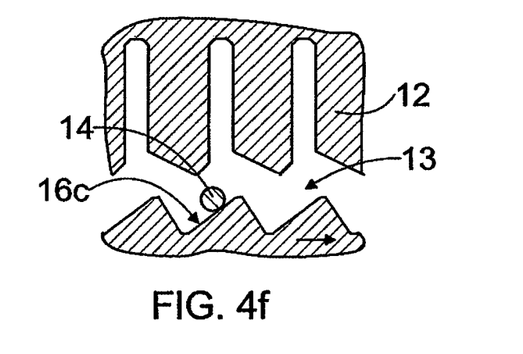
Figure 4G:
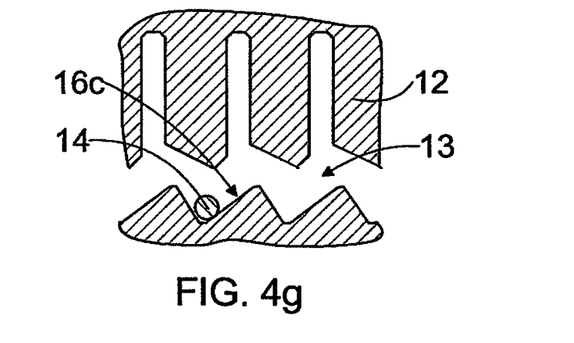

After the pin 14 hits the highest point in the groove 13, the expander head 6 will go back to its unexpanded starting position and the pin 14 will travel downwards in the straight part 16b of the groove 13, as shown in FIG. 4e. When the pin 14 travels downwards, it hits the lower sloping wall 16c. This will again turn the sleeve 12 as shown in FIG. 4f. The expander head has no contact with the inner wall of the pipe to be expanded.

The pin 14 follows the lower sloping wall 16c to the lowest point in the groove 13. This is the unexpanded starting point of the expander head 6. Thus, FIGS. 4a and 4g correspond to each other but the pin rests in an adjacent groove in a bottom position. The total turning movement of the expander head 6 between the expansions is the distance between the adjacent straight parts 16b.

Figure 5:
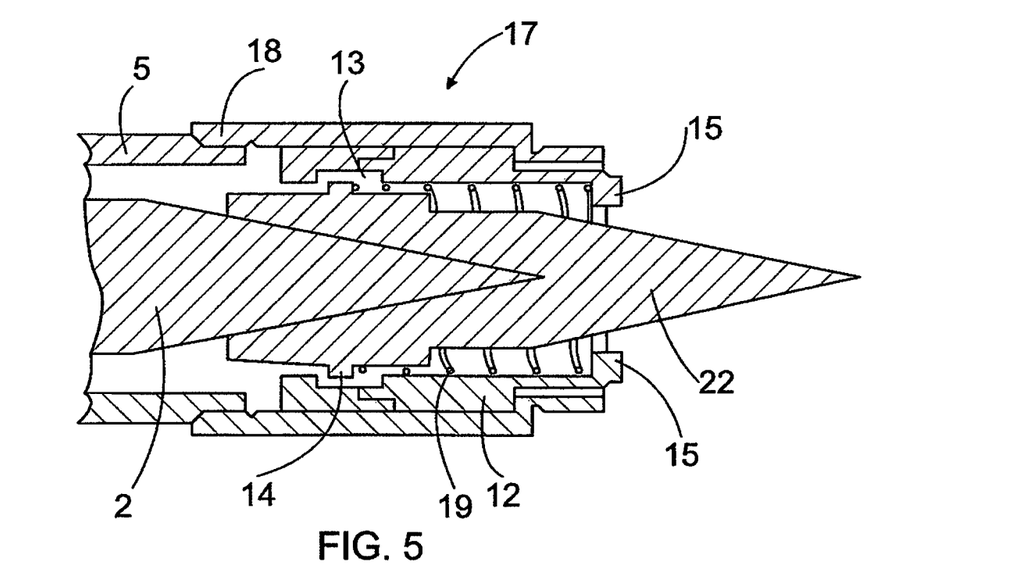
FIG. 5 is a schematic cross-sectional side view of a part of a second expander tool.

FIG. 5 shows an embodiment, in which an auxiliary twister 17 is attached with threads to the end of a housing 5 of a conventional expander tool, which originally does not have a mechanism for rotating the jaws 10. The auxiliary twister 17 comprises a stationary housing 18. An expander tool corresponding to the expander tool 6 shown in FIG. 1 is attached to the end of the housing 18. For the sake of clarity, however, the expander tool is not shown in FIG. 5.

Inside the housing 18 there is a rotating sleeve 12, which corresponds to the rotating sleeve 12 shown in FIGS. 1, 2 and 3. The auxiliary twister 17 is also provided with an auxiliary piston 22. The auxiliary piston 22 comprises pins 14, which correspond to the pins 14 of the piston 2 shown in FIGS. 1 and 2. Correspondingly, the rotating sleeve 12 comprises corresponding grooves 13 as the grooves 13 in the sleeve 12 shown in FIGS. 1, 2 and 3. The sleeve 12 is also provided with fingers 15, which correspond to the fingers 15 shown in FIGS. 1, 2 and 3.

The auxiliary twister 17 is also provided with a return spring 19, which keeps the auxiliary piston 22 in contact with the piston 2 such that they produce a reciprocating axial movement together. The auxiliary piston 22 is also provided with a locking mechanism, such as a pin and groove mechanism, which prevents it from rotating with respect to the housing 18. Thus, the auxiliary piston 22 does not rotate but only moves in the axial direction. Because of the pins 14 and the grooves 13 and the auxiliary piston 22, the axial movement of the piston 2 is transferred into a rotational movement of the sleeve 12 in a corresponding manner as disclosed in connection with the embodiment shown in FIGS. 1, 2 and 3.

With the auxiliary twister 17, the rotating mechanism can be attached to a conventional expander tool which originally has no jaw rotating mechanism. Naturally, the expander head 6 must be such that the jaws can be rotated by the fingers 15.

The amount of rotation and thus the distance between the straight parts 16b of the groove 13 may be selected as needed. Preferably, the rotation is larger than the distance between the edges of the jaws 10 when the jaws are in their expanded position. In an embodiment where the number of jaws 10 is 6, the angle of rotation may vary, for example, between 20° and 50°.

Figure 6:
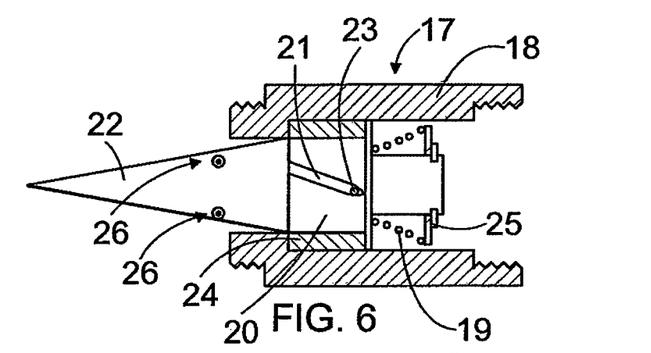
FIG. 6 is a schematic cross-sectional side view of a part of a third expander tool.
Figure 10:
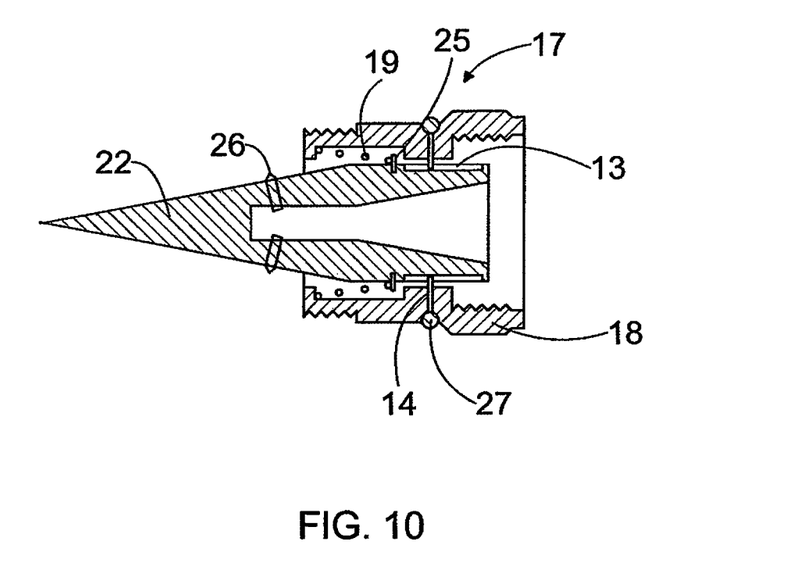
FIG. 10 is a schematic cross-sectional side view of a part of a fourth expander tool.

In the embodiments shown in FIGS. 1 to 5, the sleeve is provided with grooves and the piston is provided with pins. However, it is also possible to provide the piston with grooves and correspondingly the sleeve with pins. Further, it is also possible to make the sleeve non-rotating and, for example in the embodiment shown in FIG. 5, provide the auxiliary piston with fingers that rotate the jaws and rotate the auxiliary piston a certain amount during each reciprocating movement of the piston. FIGS. 6 and 10 disclose embodiments in which the auxiliary piston 22 is a rotation cone.

It is also possible to arrange the cover 7 and the jaws 10 such that they do not rotate with respect to each other. In such a case, the rotating sleeve 12 is arranged to rotate the cover 7, which then rotates the jaws 10.

In the embodiment disclosed in FIGS. 1 to 5, the expansion in stages is implemented by forming the outer jaw surfaces such that they enlarge from their insertion ends to the rear ends. However, the expansion in stages can also be implemented with jaws whose radial distance does not increase but, for example, the tapered end of the piston is pushed deeper and deeper inside the jaws in successive expansion stages. For example, the structure described in EP 1 118 401 could be used. Also in that case the jaws are rotated after each expansion a certain amount in the circumferential direction by guiding the reciprocating motion of the piston to rotate the jaws a certain amount in the circumferential direction.

Figure 7:
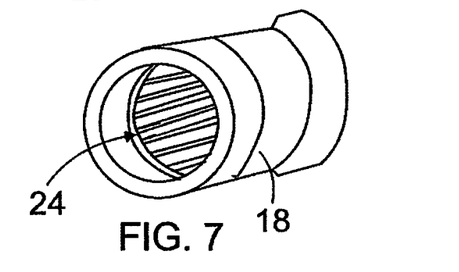
FIG. 7 is a schematic view of a housing shown in FIG. 6.
Figure 8:
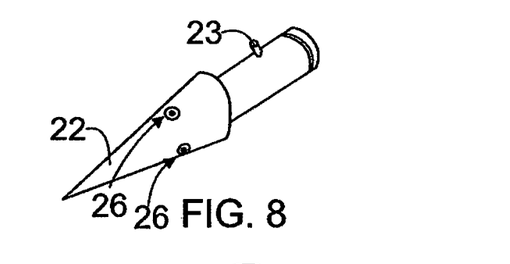
FIG. 8 is a schematic view of a rotation cone shown in FIG. 6.
Figure 9:
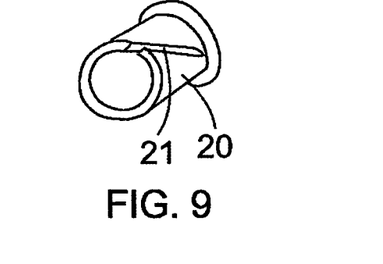
FIG. 9 is a schematic view of a rotation bushing shown in FIG. 6.

FIG. 6 shows another embodiment of an auxiliary twister 17. FIG. 7 shows the housing 18 of the auxiliary twister in more detail. FIG. 8 shows the auxiliary piston 22 or the rotation cone of the auxiliary twister in more detail. FIG. 9 shows the rotation bushing 20 of the auxiliary twister in more detail.

The auxiliary twister 17 shown in FIG. 6 comprises a housing 18, a rotation bushing 20, a rotation cone or an auxiliary piston 22 and a return spring 19. The rotation bushing 20 comprises a guideway 21. The rotation cone 22 comprises a guide pin 23, a keeper clip 25 for the return spring 19 and spring plungers 26. The inner surface of the housing 18 is provided with a one-way clutch 24.

When the rotation bushing 20 is placed onto the rotation cone 22, it is aligned by the guide pin 23 via the rotation bushing guideway 21. When the rotation cone 22 is moved forward in an axial fashion, it causes the rotation bushing 20 to rotate radially in the one-way clutch bearing 24. During a forward/axial movement of the rotation cone 22, only the rotation bushing 20 is rotating at this time. The rotation cone 22 is prevented from rotating in the forward stroke due to the forces applied between the expander tool piston and the expander head. The rotation cone 22 is "pinched" between the expander tool piston on one end of the adaptor and the expander head on the other end. The friction prevents the rotation cone 22 from rotating.

In the return stroke of the expander tool piston, the return spring 19 causes the return stroke of the rotation cone 22. In the return stroke of the rotation cone 22, the rotation bushing 20 is prevented by the one-way clutch bearing 24 from rotating in reverse. The friction between the rotation cone and the expander tool piston on one end, and the expander head on the other end, is relieved so that the rotation cone 22 is free to rotate. Because the one-way clutch bearing prevents the rotation bushing from rotating, the rotation cone guide pin 23 causes the rotation cone 22 to follow the oblique rotation bushing guideway 21, thus forcing the rotation cone 22 to move both axially and radially during the reverse/return stroke.

As the rotation cone 22 is moving forward/axially, the expander head segments separate and open a void between them. Inserted into the angled portion of the rotation cone 22 are spring plungers 26. The spring plungers 26 recede below the surface of the rotation cone 22 until the expansion takes place. As the expansion takes place, the rotation cone 22 moves forward/axially, and the spring plungers 26 protrude of the rotation cone 22 as the gaps between the segments widen.

During the return stroke the rotation cone 22 is moving both axially and radially. As the rotation cone 22 moves radially, the spring plungers 26 push the segments along with the rotation cone as it moves axially and radially.

When the expansion head segments are fully closed, the spring plungers are receded back down into the rotation cone 22 awaiting the next cycle. The spring plungers 26 are pushed back down by the expander head segments. The spring 11 on the expander head is stronger than the springs on the spring plungers 26. So, when the rotation cone 22 is returned to its resting/home position, the spring plungers 26 are immediately under the expander head spring. This causes the segments on the expander head to force the spring plungers 26 back down.

The spring plungers 26 can also be replaced by, for example, fingers 15 shown in the embodiments described above.

In the embodiment shown in FIG. 10 the grooves 13 are formed on the outer surface of the auxiliary piston 22, which is a rotation cone. The pins 14 are spring-loaded such that the pins 14 follow the bottom of the groove 13. The pins 14 can be spring-loaded by a circumferential spring 27, for example.

Figure 11:
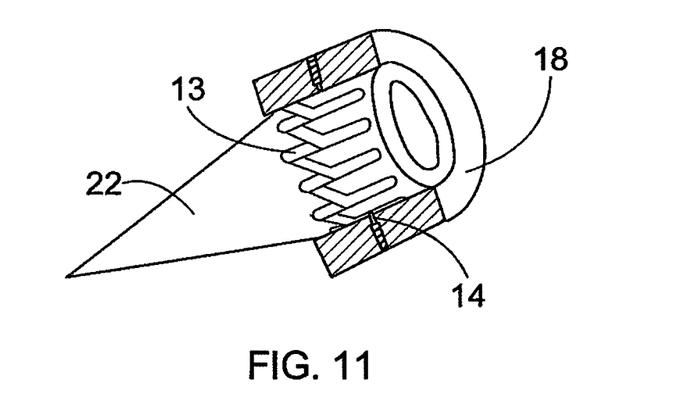
FIG. 11 is a schematic view of an auxiliary piston shown in FIG. 10.

FIG. 11 schematically shows the structure of the rotation cone 22. Especially FIG. 11 shows the geometry of the grooves 13. For the sake of clarity, the structure of the housing is only shown schematically and the spring or springs pushing the pins 14 towards the grooves 13 are not shown in FIG. 11. Further, for the sake of clarity, the spring-plungers 26 are not shown in FIG. 11.

Figure 12:
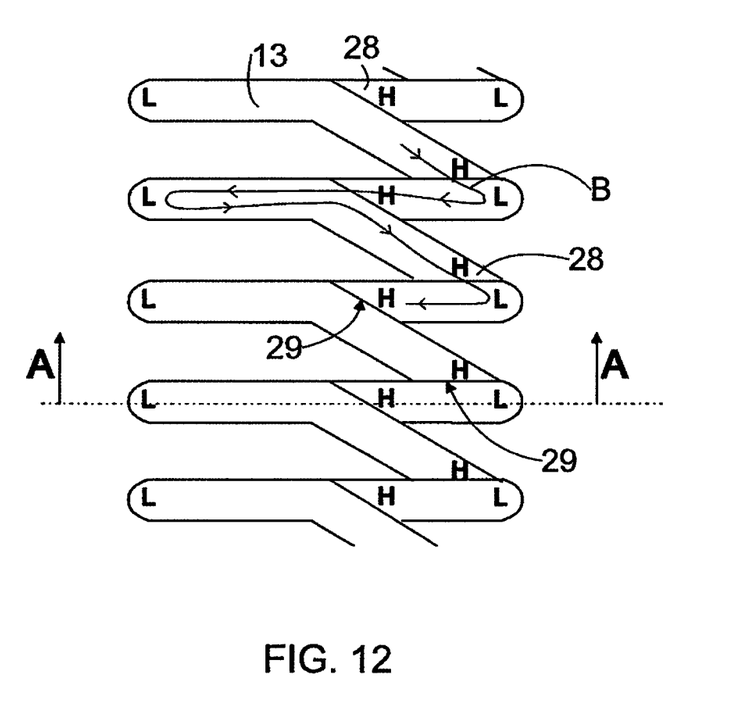
FIG. 12 is a schematic top view of grooves in the auxiliary piston shown in FIG. 10.
Figure 13:
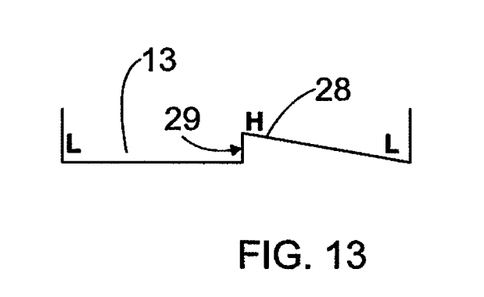
FIG. 13 is a schematic cross-sectional side view along line A-A of FIG. 12.

FIGS. 12 and 13 illustrate the details of the grooves 13. The bottom of the groove comprises high spots and low spots. In FIGS. 12 and 13, the high spots are denoted with letter H and the low spots are denoted with letter L. The high spots H form shelves 28. The edge of the shelf 28 forms a wall 29. The pin 14 is spring-loaded to follow the bottom of the groove. The walls 29 at the edges of the shelves 28 guide the pins 14. Thus, the pins 14 follow the path that is denoted by line B provided with arrow heads. Thus, the pin 14 follows the groove 13 transitioning from a low spot L to a high spot H and then falls off the shelf 28 into a low spot in the groove 13. The wall 29 at the edge of the shelf 28 prevents the pin 14 from going backward in the groove 13. This action will continue and repeat after each stroke.

In some cases the features disclosed in the present application may be used as such, irrespective of other features. On the other hand, the features set forth in the present application may, when necessary, be combined in order to provide different combinations.

It will be obvious to a person skilled in the art that, as the technology advances, the inventive concept can be implemented in various ways. The invention and its embodiments are not limited to the examples described above but may vary within the scope of the claims.

The invention claimed is:

1. A tool for expanding a pipe end, the tool comprising
a plurality of jaws, which are radially movable in relation to a center axis between a retracted position and an outer expanding position and which, when retracted, are configured to be inserted into the pipe end, wherein the movable jaws have outer jaw surfaces which are configured for engagement with the inner surface of the pipe end and which lie adjacent to one another in the retracted position of the jaws and have an at least generally circular arcuate cross section,
a piston or cone with a tapered end for moving the jaws between said positions, an actuator configured to move the piston or cone in an axial direction such that the plurality of jaws are moved between the retracted position and the outer expanding position, and
a guide mechanism configured to maintain the plurality of jaws circumferentially in a first position as the plurality of jaws are moved from the retracted position to the outer expanding position and to rotate the movable jaws a certain amount in a circumferential direction when the jaws are in a position configured not to be in contact with the inner surface of the pipe end.

2. A tool according to claim 1, wherein
the tool is provided with a sleeve around the piston or cone, whereby the sleeve and the piston or cone are provided with surfaces facing each other and provided with grooves and pins for making a certain amount of rotation in the circumferential direction.

3. A tool according to claim 2, wherein
the grooves comprise sloping walls for guiding the pins.

4. A tool according to claim 1, wherein
the piston or cone is provided with grooves and the tool comprises a pin that follows the grooves to provide the rotation of the jaws.

5. A tool according to claim 4, wherein
the bottom of the groove is provided with high spots and low spots and the pin is arranged to follow the bottom of the groove.

6. A tool according to claim 1, wherein
the tool is provided with a bushing around the piston or cone, wherein the bushing is provided with an oblique guideway and the piston or cone is provided with a guide pin and a clutch bearing allowing the bushing to rotate in one direction and preventing the bushing from rotating in another direction.

7. A tool according to claim 1, wherein
the piston or cone is allowed to rotate a certain amount in the circumferential direction.

8. A tool according to claim 1, wherein
the guide mechanism is positioned inside a housing of the expander tool.

9. A tool according to claim 1, wherein
the guide mechanism is positioned in a part between a housing of the tool and an expander head.

10. A tool according to claim 2, wherein
the piston or cone is provided with grooves and the tool comprises a pin that follows the grooves to provide the rotation of the jaws.

11. A tool according to claim 2 wherein
the guide mechanism is positioned inside the housing of the expander tool.

12. The tool of claim 1 wherein the amount of rotation is greater than the distance between an edge of a first movable jaw of the movable jaws and an edge of a second movable jaw of the movable jaws when the movable jaws are in the outer expanding position.

13. The tool of claim 1 wherein the rotation of the movable jaws in a circumferential direction is initiated and completed prior to the outer jaw surfaces engaging the inner surface of the pipe.

14. A tool for expanding a pipe end, the tool comprising
a plurality of jaws, which are radially movable in relation to a center axis between a retracted position and an outer expanding position and which, when retracted, are configured to be inserted into the pipe end, wherein the movable jaws have outer jaw surfaces which are configured for engagement with the inner surface of the pipe end and which lie adjacent to one another in the retracted position of the jaws and have an at least generally circular arcuate cross section,
a piston or cone with a tapered end for moving the jaws between said positions, an actuator that moves the piston or cone in a reciprocating manner in the axial direction in such a way that the pipe end is gradually expanded in a plurality of expansion stages in which each of the expansion stages includes radially moving the jaws between the retracted position and the outer expanding position, and a guide mechanism that guides the axial reciprocating movement of the piston or cone to rotate the jaws to a certain extent in the circumferential direction after each expansion stage when the jaws are in a position configured not to be in contact with the inner surface of the pipe end.

15. A tool according to claim 14 wherein, for each expansion stage, before the expansion stage, the jaws are circumferentially at a first position and before the next expansion stage, the jaws are circumferentially at a second position, different from the first position.

* * * * *